(12) United States Patent
Le Gallo-Bourdeau et al.

(10) Patent No.: US 12,093,802 B2
(45) Date of Patent: Sep. 17, 2024

(54) GATED UNIT FOR A GATED RECURRENT NEURAL NETWORK

(71) Applicant: INTERNATIONAL BUSINESS MACHINES CORPORATION, Armonk, NY (US)

(72) Inventors: Manuel Le Gallo-Bourdeau, Zurich (CH); Vinay Manikrao Joshi, Maharashtra (IN); Abu Sebastian, Adliswil (CH); Milos Stanisavljevic, Adliswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1003 days.

(21) Appl. No.: 17/074,797

(22) Filed: Oct. 20, 2020

(65) Prior Publication Data

US 2022/0121901 A1    Apr. 21, 2022

(51) Int. Cl.
*G06N 3/0442* (2023.01)
*G06N 3/04* (2023.01)
(Continued)

(52) U.S. Cl.
CPC ............. *G06N 3/0442* (2023.01); *G06N 3/04* (2013.01); *G06N 3/044* (2023.01); *G06N 3/063* (2013.01); *G06N 3/048* (2023.01); *G06N 3/08* (2013.01)

(58) Field of Classification Search
CPC .......... G06N 20/00; G06N 5/04; G06N 20/10; G06N 20/20; G06N 3/02; G06N 3/04;
(Continued)

(56) References Cited

U.S. PATENT DOCUMENTS

| 11,120,328 B1* | 9/2021 | Nair ................. G06N 3/045 |
| 11,568,228 B2* | 1/2023 | Hoang ............... G06N 3/063 |

(Continued)

FOREIGN PATENT DOCUMENTS

| CN | 116267023 A | 6/2023 |
| DE | 112021004664 T5 | 6/2023 |

(Continued)

OTHER PUBLICATIONS

Gate-Variants of Gated Recurrent Unit (GRU) Neural Networks (Year: 2017).*

(Continued)

*Primary Examiner* — Shane D Woolwine
(74) *Attorney, Agent, or Firm* — Steven M. Bouknight

(57) ABSTRACT

The exemplary embodiments disclose a method, a computer program product, and a computer system for a gated recurrent neural network (RNN). The exemplary embodiments may include providing an element processor, providing a distinct memory array for a respective set of one or more elements of a hidden state vector, storing in the memory array a group of columns of weight matrices that enable a computation of the set of one or more elements, computing one or more elements of each of multiple activation vectors using a set of one or more columns of the group of columns associated with each of the multiple activation vectors, and performing by the element processor an elementwise gating operation on computed elements, resulting in the set of one or more elements.

20 Claims, 11 Drawing Sheets

(51) Int. Cl.
*G06N 3/044* (2023.01)
*G06N 3/048* (2023.01)
*G06N 3/063* (2023.01)
*G06N 3/08* (2023.01)

(58) Field of Classification Search
CPC ...... G06N 3/044; G06N 3/0442; G06N 3/048; G06N 3/063; G06N 3/08
See application file for complete search history.

(56) References Cited

U.S. PATENT DOCUMENTS

| | | | |
|---|---|---|---|
| 2007/0250461 A1* | 10/2007 | Sabe | G06N 3/088 706/12 |
| 2017/0103305 A1* | 4/2017 | Henry | G06N 3/044 |
| 2017/0140263 A1 | 5/2017 | Kaiser | |
| 2018/0189638 A1 | 7/2018 | Nurvitadhi | |
| 2019/0138887 A1* | 5/2019 | Salem | G06F 17/16 |
| 2019/0324748 A1 | 10/2019 | Fowers | |
| 2020/0026498 A1 | 1/2020 | Sumbul | |

FOREIGN PATENT DOCUMENTS

| | | |
|---|---|---|
| GB | 2615911 A | 8/2023 |
| JP | 2023545299 A | 10/2023 |
| WO | 2022084794 A1 | 4/2022 |

OTHER PUBLICATIONS

Adam et al., "Memristive LSTM network hardware architecture for time-series predictive modeling problems", arXiv:1809.03119v1, [cs.ET], Sep. 10, 2018, pp. 1-4.

Li et al., "Long short-term memory networks in memristor crossbar arrays", Jan. 2019, Nature Machine Intelligence, www.nature.com/hatmachintell, pp. 1-9.

Mell et al., "The NIST Definition of Cloud Computing", National Institute of Standards and Technology, Special Publication 800-145, Sep. 2011, pp. 1-7.

Smagulova et al., Design of CMOS-memristor Circuits for LSTM architecture, IEEE Xplore, Sep. 23, 2020, pp. 1-2.

Notification of Transmittal of the International Search Report and the Written Opinion of the International Searching Authority, or the Declaration, File Reference P201911830, International application No. PCT/IB2021/059271, International Filing Date Oct. 10, 2021, Mailed on Jan. 20, 2022, 7 pages.

\* cited by examiner

GATED UNIT FOR A GATED RECURRENT NEURAL NETWORK

BACKGROUND

The present invention relates to the field of digital computer systems, and more specifically, to a gated unit for a gated recurrent neural network.

Neural networks are a computational model used in artificial intelligence systems. Neural networks are based on multiple artificial neurons. Each artificial neuron is connected with one or more other neurons, and links can enhance or inhibit the activation state of adjoining neurons. The accuracy of neural networks on a variety of cognitive tasks attracts a lot of interest in designing hardware accelerators for training or inference of deep neural networks. In training or inference of gated recurrent neural networks (RNNs), for example long short-term memory (LSTM) networks, a set of element-wise operations are computed on the dimensional vectors. These computations may, however, be resource intensive.

SUMMARY

The exemplary embodiments disclose a method, a computer program product, and a computer system for a gated recurrent neural network (RNN). The exemplary embodiments may include providing an element processor, providing a distinct memory array for a respective set of one or more elements of a hidden state vector, storing in the memory array a group of columns of weight matrices that enable a computation of the set of one or more elements, computing one or more elements of each of multiple activation vectors using a set of one or more columns of the group of columns associated with each of the multiple activation vectors, and performing by the element processor an elementwise gating operation on computed elements, resulting in the set of one or more elements.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
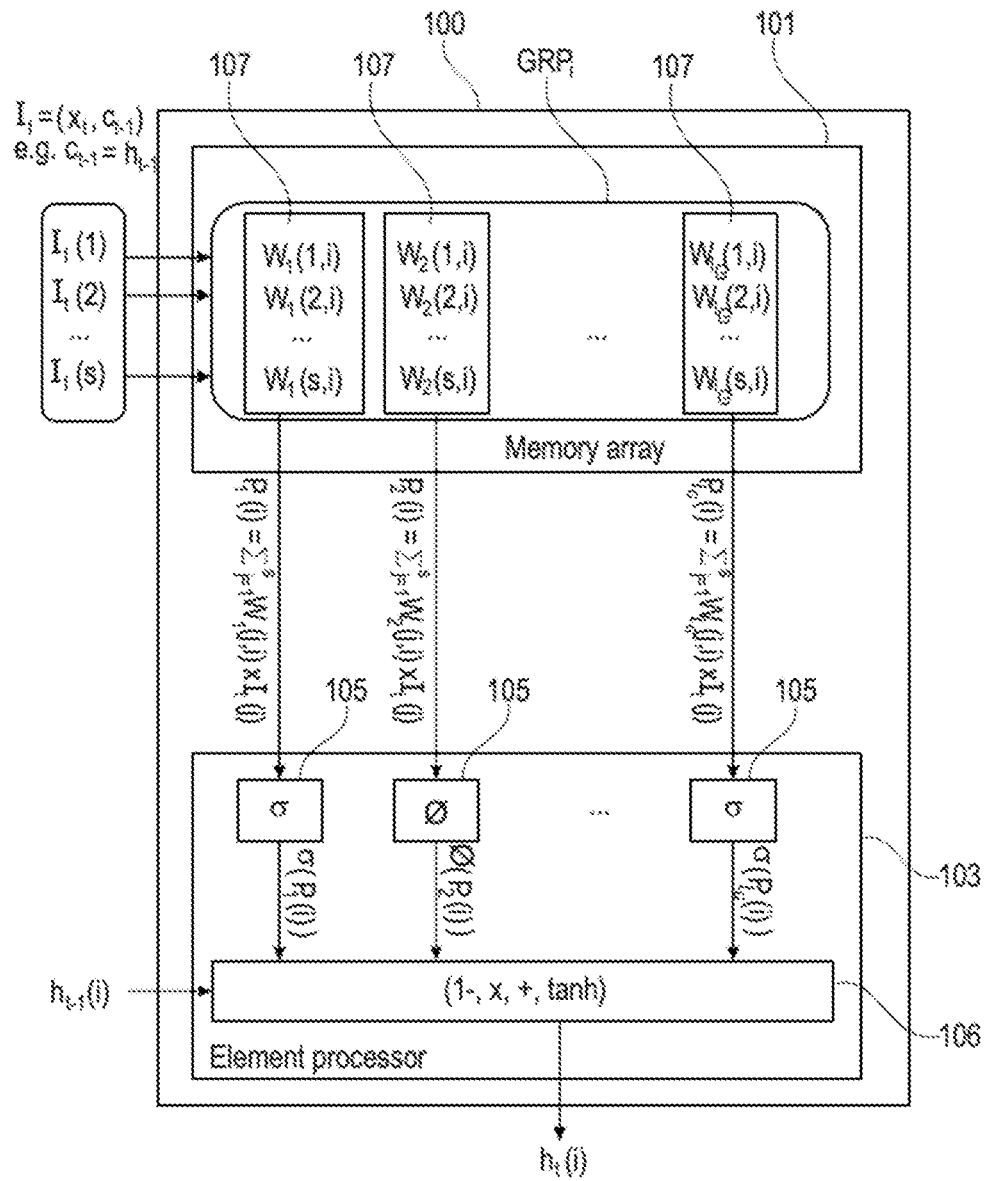
FIG. 1 depicts a diagram of an electronic system, in accordance with the exemplary embodiments.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A recurrent neural network may be an artificial neural network where connections between nodes of the network may form a graph (e.g. directed graph) along a temporal sequence. This may allow it to exhibit temporal dynamic behavior. The recurrent neural network may be a network of neuron-like nodes organized into successive layers. Nodes are either input nodes (receiving data from outside of the network), output nodes (yielding results), or hidden nodes (that modify the data from input to output). The nodes of the recurrent neural network may comprise one or more gated units and may thus be referred to as a gated recurrent neural network e.g. each node of the nodes may comprise a gated unit. The gated unit may, for example, comprise a gated recurrent unit (GRU) or a long short-term memory (LSTM) unit.

The gated unit may comprise a number $1_G$ of gates. For example, in the case of a gated recurrent unit, the number $1_G$ of gates may be smaller than or equal to three, $1_G \leq 3$ e.g. $1_G=2$ for a minimal gated unit and $1_G=3$ for a fully gated unit. Each gate of the $1_G$ gates may receive an input vector and in response may provide a respective vector which may be referred to as an activation vector. The gated unit may enable a non-linear transformation that maps an input signal $x_t$ at time t and the hidden state $h_{t-1}$ of the previous time step t−1 to the current hidden state $h_t$. Each of the input signal $x_t$ and the hidden state $h_t$ may be a vector. The gated unit may receive as input a vector $I_t$ at time t. The input vector $I_t$ may, for example, be a concatenation of the input signal vector $x_t$ at time t and the hidden state vector $h_{t-1}$ at time t−1. The hidden state vector $h_t$ may be defined by an elementwise gating operation of the activation vectors. Each of the $1_G$ activation vectors may be defined as a function of a respective weight matrix W. For example, each of the $1_G$ activation vectors may be a function of a weighted vector $P_j$. The weighted vector $P_j$ at a time t may result from at least a multiplication of a respective input vector $I_t$ by a distinct weight matrix $W_j$ associated with the activation vector.

Thus, a number $l_G$ of weight matrices may be used to compute the set of elements of the hidden state vector $h_t$ in accordance with the present subject matter. The hidden state vector $h_t$ may belong to the group $\mathbb{R}^k$. The input signal $x_t$ may belong to the group $\mathbb{R}^d$. Each of the $l_G$ activation vectors may belong to the group $\mathbb{R}^k$. Each of the $l_G$ of weight matrices may belong to the group $\mathbb{R}^{k \times s}$, where s is the size of the input vector $I_t$. The input vector $I_t$ at time t may, for example, comprise the elements of the input signal vector $x_t$ at time t and the element of the hidden state vector $h_{t-1}$ of the previous time step t−1, thus s=k+d. The hidden state vector $h_t$ may comprise k elements. Each element $h_e(i)$ (i varies between 1 and k) of the elements of the hidden state vector $h_t$ may have a respective element position e.g. indicative of the index i.

Following the example of the fully gated unit, the gates may comprise a reset gate, update gate and an activation gate. The activation gate may provide a candidate hidden state vector. The activation vector of the reset gate may be defined as follows: $r_t = \sigma_g(P_r)$. The activation vector of the update gate may be defined as follows: $z_t = \sigma_g(P_z)$. The activation vector of the activation gate may be defined as follows: $\tilde{h}_t = \varnothing_h(P_h)$. The function $\sigma_g$ is a sigmoid function. $\varnothing_h$ is a hyperbolic tangent function. $P_r$, $P_z$ and $P_h$ are the weighted vectors. For example, each of the weighted vectors may be obtained as follows: $P_r = W_r I_t^r$, $P_s = W_z I_t^z$ and $P_h = W_h I_t^k$, where $W_r$, $W_z$ and $W_h$ are weight matrices that are associated respectively with the activation vectors $r_t$, $z_t$ and $\tilde{h}_t$. $I_t^r$, $I_t^s$ and $I_t^h$ are input vectors associated with the reset gate, update gate and activation gate respectively e.g. each of the input vectors $I_t^r$, $I_t^z$ and $I_t^h$ may be weighted before being input to the respective gate. The input vector $I_t^r$ may be a concatenation of the input signal vector $x_t$ and the hidden state vector $h_{t-1}$. The input vector $I_t^z$ may be a concatenation of the input signal vector $x_t$ and the hidden state vector $h_{t-1}$. The input vector $I_t^h$ may be a concatenation of the input signal vector $x_t$ and the following vector: $r_t \odot h_{t-1}$. In other words, the input vector associated with a gate may be modified by the gated unit so that it is not a mere concatenation of $x_t$ and $h_{t-1}$ but a concatenation of $x_t$ and another vector that may result from an element wise operation of an output of one gate and the vector $h_{t-1}$. In another example, each of the weighted vectors may be obtained as follows: $P_r = W_r I_t^r + b_r$, $P_x = W_x I_t^Z + b_x$ and $P_h = W_h I_t^h + b_h$, where $b_r$, $b_x$ and $b_h$ may be bias vectors. In other words, the weighted vector results from a multiplication of an input vector by a distinct weight matrix and an addition of a bias vector.

Hence, the training or inference of such gated recurrent neural networks may involve a set of element-wise operations on high dimensional vectors such as vectors $I_t^r$, $I_t^z$ and $I_t^h$. However, computing element-wise operations on high dimensional vectors may be a costly hardware implementation in the hardware accelerators for the following reasons. First, the scaling of the hardware implementation with the size of vectors may be potentially expensive in terms of area and power requirements. Secondly, in resource constrained applications, multiplexing could be difficult due to large vectors stored in memory units that are distant from each other. The present subject matter may address this problem by mapping parameters of the gated recurrent neural network to an array of computational units that can facilitate design of a scalable and multiplexable hardware implementation of the element-wise operations. The selective storage of columns of the weight matrices into respective locations of the memory array may be referred to as mapping.

The present subject matter may enable an efficient computation of the hidden state vector as it may compute a set of one or more elements of the hidden state vector at a time. This is by contrast to the conventional methods, where the computation of the whole hidden state vector is performed at a time after the computation of every element of the activation vectors is performed. The set of elements (named SET) of the hidden state vector computed at a time in accordance with the present subject matter may comprise a number of elements n, where n is smaller than or equal to the number of elements of the hidden state vector (n≤k). In case n−k, the present subject matter may provide an alternative solution to the conventional methods. The number of elements n of the set of elements may, for example, be a configurable parameter e.g. the value of the number of elements n may be defined by a user.

The elements of the hidden state vector may be divided into a number N of distinct sets of elements $SET_1$, $SET_2 \ldots SET_N$. The sets of elements $SET_1$, $SET_2 \ldots SET_N$ may or may not each comprise the same number of elements n. In one example, the number of elements n may be defined so that the ratio $$N = \frac{k}{n}$$

between the total number k of elements of the hidden state vector and the number of elements n of the set of elements SET is an integer number. A set of elements $SET_1$ may, for example, be noted as $h_t(i:j:l)$ to indicate that the elements of the hidden state vector $h_t$ having the positions/index i, j and l are elements of the set $SET_1$.

The method may be performed in order to compute one of the sets of elements $SET_1$, $SET_2 \ldots SET_N$ at a time. In order to compute all elements of the hidden state vector, the method may be repeated in order to compute the remaining non computed elements of the hidden state vector. For example, the method may be repeated N−1 times in order to compute the sets of elements $SET_1$, $SET_2 \ldots SET_N$. In each iteration of the method, one distinct set of the sets of elements $SET_1$, $SET_2 \ldots SET_N$ may be computed at a time. According to one embodiment, the method further comprises repeating steps for one or more other distinct sets of elements of the hidden state vector, until all elements of the hidden state vector are computed. That is, for each set of elements SET of the sets of elements $SET_1$, $SET_2 \ldots SET_N$ an element processor ($EP_j$) and a memory array ($MA_j$) may be provided, where j varies between 1 and N. For example, an electronic unit (e.g. integrated circuit) comprising the N element processors and the N memory arrays may be provided so that the computation of the sets of elements $SET_1$, $SET_2 \ldots SET_N$ may be performed concurrently or in parallel. Thus, according to one embodiment, the repeating of steps is performed concurrently.

Alternatively, a part of the computation of the sets of elements $SET_1$, $SET_2 \ldots SET_N$ may be sequentially performed and another part of the computation may concurrently be performed. For that, a number M of element processors may be provided, wherein the number M of element processors is smaller than the number of sets of elements N, M<N. In this case, each element processor may be assigned respective sets of elements. In the case that an element processor is associated to two or more sets of elements, the element processor may be multiplexed across the inputs so that it computes one set of elements at a time.

However, in order to minimize the area requirement of the hardware implementation, the number M of element processors may be chosen as small as possible. Thus, according to one embodiment, the method further comprises repeating steps for one or more other distinct sets of elements of the hidden state vector, until all elements of the hidden state vector are computed, wherein the (single) element processor is provided with a multiplexing feature such that it computes one set of elements at a time.

The element processor may compute the respective set of elements of the hidden state vector in accordance with the following embodiment. Each element of the set of elements has a respective element position in the hidden state vector. The computed elements of the activation vectors comprise multiple sets of one or more computed elements of the multiple activation vectors respectively. Each set of computed elements has the set of element positions in the respective activation vector. For each activation vector of the multiple activation vectors, the computing comprises: receiving at the memory array values of the input vector and outputting from the associated set of one or more columns a set of elements (named result elements) of the weighted vector respectively, said set of result elements having the set of element positions in the weighted vector, feeding the set of result elements to the element processor, and performing the computation of the set of computed elements of the activation vector using the set of result elements.

According to one embodiment, the memory array comprises row lines and column lines intersecting the row lines, and computational memories coupled between the row lines and the column lines at the junctions formed by the row and column lines. Each computational memory of the computational memories represents a value of a respective element of the columns. The storing of the columns comprises storing all elements of each column in computational memories of a respective single column line of the memory array.

According to one embodiment, the computational memory is any one of resistive memory element, SRAM or flash memory element.

FIG. 1 depicts a diagram of an electronic system 100 in accordance with an example of the present subject matter. The electronic system 100 may be a gated unit of a gated recurrent neural network. The gated unit may have a hidden state vector $h_t$. The hidden state vector $h_t$ may be defined by an elementwise gating operation of a number, $l_G$ of activation vectors $V_t^1, V_t^2 \ldots V_t^{l_G}$. Each of the $l_G$ activation vectors may be defined as a function of a respective weight matrix $W_j$. For example, each of the $l_G$ activation vectors may be a function of a weighted vector $P_j$. The weighted vector at a time t may result from a multiplication of a respective input vector $I_t$ by a distinct weight matrix $W_j$ associated with the activation vector. However, the computation of all elements of the hidden state vector at a time may have several constraints on the hardware implementation. The electronic system 100 may solve this as it may be configured to compute a single element of the hidden state vector $h_t$. The element of the hidden state vector $h_t$ may be the element $h_t(i)$ having the index or element position i.

The electronic system 100 may be configured to perform a non-linear transformation that maps an input signal $x_t$ at time t and a hidden state $h_{t-1}$ of the previous time step t-1 to an element $h_t(i)$ of the current hidden state $h_t$. The hidden state vector $h_t$ may belong to the group $\mathbb{R}^k$. The input signal $x_t$ may belong to the group $\mathbb{R}^d$. Each of the $l_G$ activation vectors may belong to the group $\mathbb{R}^k$. Each of the $l_G$ weight matrices may belong to the group $\mathbb{R}^{k \times s}$, where s is the size of the input vector $I_t$. The input vector $I_t$ at time t may, for example, comprise the elements of the input signal vector $x_t$ at time t and elements of the hidden state vector $h_{t-1}$ of the previous time step t-1, thus s=k+d. In another example, the input vector $I_t$ associated with a gate may be modified (before being input to the memory array) by the gated unit so that it is not a mere concatenation of $x_t$ and $h_{t-1}$ but a concatenation of $x_t$ and another vector that may result from an element wise operation of an output of one gate of element processor 103 and the vector $h_{t-1}$. The hidden state vector $h_t$ may comprise k elements. Each element $h_t(i)$ (i varies between 1 and k) of the elements of the hidden state vector $h_t$ may have a respective element position e.g. indicative of the index t. $h_t(1)$ is the first element of the hidden state vector $h_t$.

The electronic system 100 comprises a memory array 101 and an element processor 103. The element processor 103 comprises a number $l_G$ of gates 105 that provide the activation vectors $V_t^1, V_t^2 \ldots V_t^{l_G}$ at a time t respectively. For example, in case of a minimal gated unit $l_G=2$ and in case of a LSTM, $l_G=4$. Each gate of the $l_G$ gates 105 may have an activation function such as a sigmoid function σ and a hyperbolic tangent function Ø. The element processor 103 may further comprise other electronic elements 106 that enable it to perform element-wise operations on vectors and to apply activation functions. As indicated in FIG. 1, the electronic elements 106 may be configured to perform element-wise multiplication, vector addition and vector subtraction (vector addition with negative value).

Following the example of the minimal gated unit, the element processor 103 may comprise two gates and the corresponding two activation vectors may be defined as follows:

$$V_t^1 = f_t = \sigma_g(w_f x_t + u_f h_{t-1} + b_f) = \sigma_g(W_f I_t^f + b_f)$$

$$V_t^2 \hat{h}_t \emptyset_h(w_h x_t + u_h(f_t \odot h_{t-1}) + b_h) = \emptyset_h(W_h I_t^h + b_h)$$

In this case, the hidden state vector may be defined as follows: $h_t = (1-f_t) \odot h_{t-1} + f_t \odot \hat{h}_t$. The weighted vectors $P_1$ and $P_2$ may be equal to (at a time t) $w_f x_t + u_f h_{t-1} + b_f$ and $w_h x_t (f_t \odot h_{t-1}) + b_h$ respectively. Th weight matrices may be $W_f$ and $W_h$.

The memory array 101 comprises a number of rows and columns that enables it to store a group of columns, named $GRP_i$. The group of columns comprises columns of the weight matrices $W_1, W_2, \ldots W_{l_G}$ that enable the determination of elements $V_t^1(i), V_t^2(i) \ldots V_t^{l_G}(i)$ of the activation vectors $V_t^1, V_t^2 \ldots V_t^{l_G}$ respectively. For example, the computation of the element $V_t^1(i)$ may require the input vector $I_t$ and the column number i the weight matrix $W_1$. The column number (or position) i of the weight matrix $W_1$ may comprise the elements: $W_1(1,i), W_1(2,i) \ldots W_1(s,i)$. The computation of the element $V_t^2(i)$ may require the input vector $I_t$ and the column number i of the weight matrix $W_2$. The column number i of the weight matrix $W_2$ may comprise the elements: $W_2(1,i), W_2(2,i) \ldots W_2(s,i)$ and so on. Thus, the group of columns $GRP_i$ that enables to compute the element $h_t(i)$ may comprise all columns 107 at position i of the weight matrices $W_1, W_2, \ldots W_{l_G}$. The memory array 101 may be configured to receive the input vector $I_t$ and to output at each column 107 the element $P_j(i)$ at position i of a respective weighted vector $P_j$.

Following the example of the minimal gated unit, in order to compute the element $h_t(i)$ the activation vector elements $\hat{h}_t(i)$ and $f_t(i)$ may need to be computed. In order to compute the element $f_t(i)$, the column at position of the weight matrix $W_f$ may be stored in a column of the memory array 101. In order to compute the element $\hat{h}_t(i)$ the column at position i of the weight matrix $W_h$ may be stored in another consecutive column of the memory array. Thus, the group of columns $GRP_t$ is formed by the two columns.

The element $P_j(i)$ of the weighted vector $P_j$ of each of the columns 107 is provided as input to a respective gate 105 of the element processor 103 so that the activation function of each of the gates 105 may be applied on the respective received weighted vector element $P_j(i)$. This may result in the activation vectors elements $V_t^1(i), V_t^2(i) \ldots V_t^{lG}(i)$. The activation vectors elements $V_t^1, V_t^2(i) \ldots V_t^{lG}(i)$ may further be processed by the element processor 103 using the electronic elements 106 in order to perform element-wise operations that enable to obtain the element $h_t(i)$.

Following the example of the minimal gated unit, the element processor 103 may be configured to perform the computation of $(1-f_t(i))\odot h_{t-1}(i)+f_t(i)\odot \hat{h}_t(i)$. In this case, the elementwise gating operation includes element wise multiplications.

Figure 2:
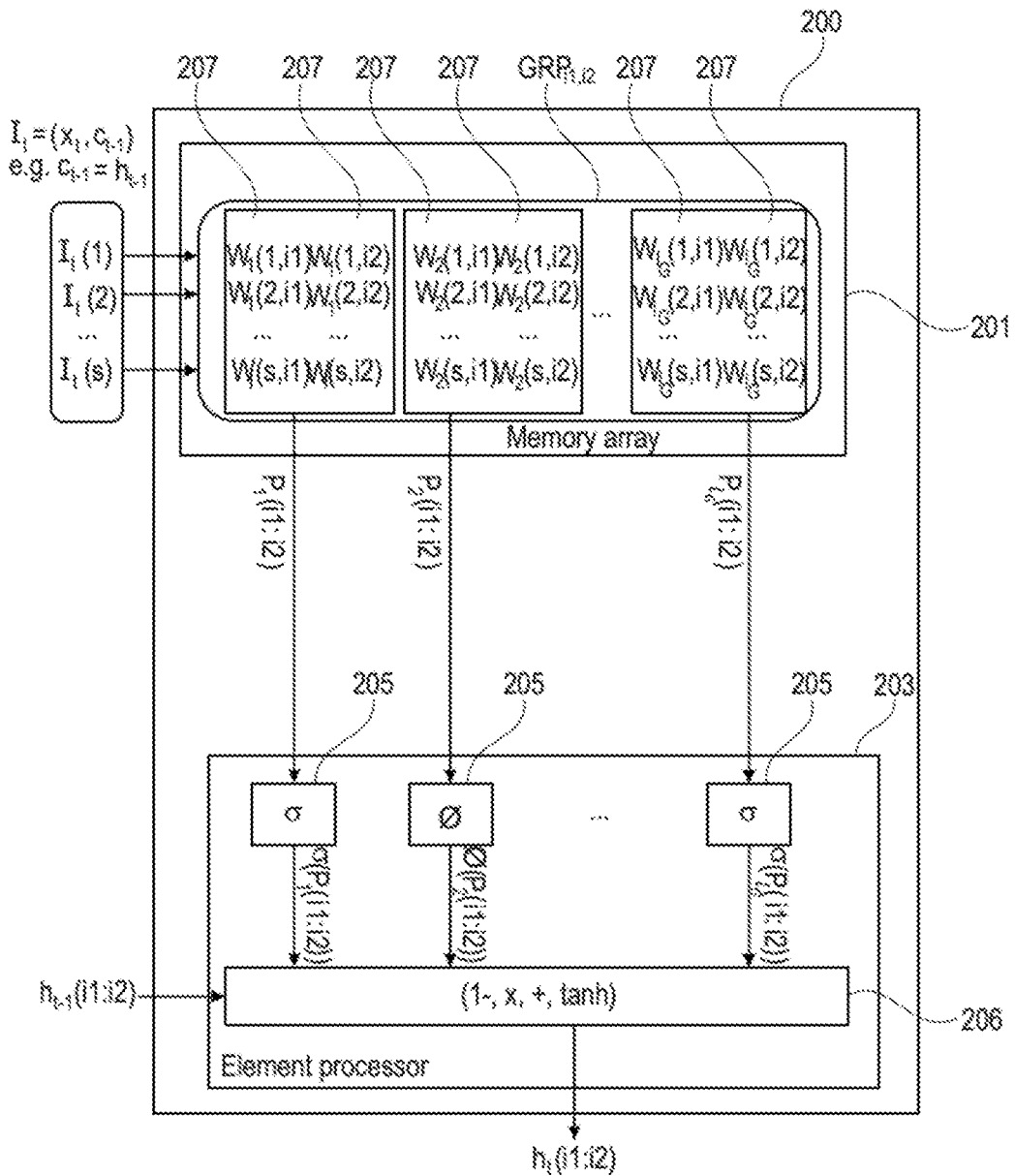
FIG. 2 depicts a diagram of an electronic system, in accordance with the exemplary embodiments.

FIG. 2 depicts a diagram of an electronic system 200 in accordance with an example of the present subject matter. The electronic system 200 may be configured to compute a set of two elements $h_t(i1:i2)$ of the current hidden state $h_t$. The electronic system 200 may be configured to perform a non-linear transformation that maps an input signal $x_t$ at time t and a hidden state $h_{t-1}$ of the previous time step t−1 to the set of two elements $h_t(i1:i2)$ of the current hidden state $h_t$.

The electronic system 200 comprises a memory array 201 and an element processor 203. The memory array 201 stores a group $GRP_{i1,i2}$ of columns of the weight matrices $W_1$, $W_2, \ldots W_{lG}$ that enable to determine the elements $V_t^1(i1:i2)$, $V_t^2(i1:i2) \ldots V_t^{lG}(i1:i2)$ of the activation vectors $V_t^1$, $V_t^2 \ldots V_t^{lG}$ respectively. For example, the computation of the elements $V_t^1(i1:i2)$ may require the input vector $I_t$ and the two columns at positions i1 and i2 of the weight matrix $W_1$. The column at position i1 of the weight matrix $W_1$ may comprise the elements: $W_1(i1:i2), W_1(2,i1) \ldots W_1(s,i1)$. The column at position i2 of the weight matrix $W_1$ may comprise the elements: $W_1(1,i2), W_1(2,i2) \ldots W_1(s,i2)$ and so on. The columns 207 of the same weight matrix are stored consecutively in the memory array. This may minimize the area requirement of the hardware implementation. The memory array 201 may be configured to receive the input vector $I_t$ and to output at each column 207 the elements $P_j(i1:i2)$ at positions i1 and i2 of a respective weighted vector $P_j$.

Each pair of elements $P_j(i1,i2)$ of the weighted vector $P_j$ of each of the columns 207 is provided as input to a respective gate 205 of the element processor 203 so that the activation function of each of the gates 105 may be applied on the respective received weighted vector elements $P_j(i1, i2)$. This may result in the activation vector elements $V_t^1(i1:i2), V_t^2(i1:i2) \ldots V_t^{lG}(i1:i2)$. The activation vector elements $V_t^1(i1:i2), V_t^2(i1:i2) \ldots V_t^{lG}(i1:i2)$ may further be processed by the element processor 203 using the electronic elements 206 in order to perform element-wise operations that enable to obtain the set of elements $h_t(i1:i2)$.

Figure 3:
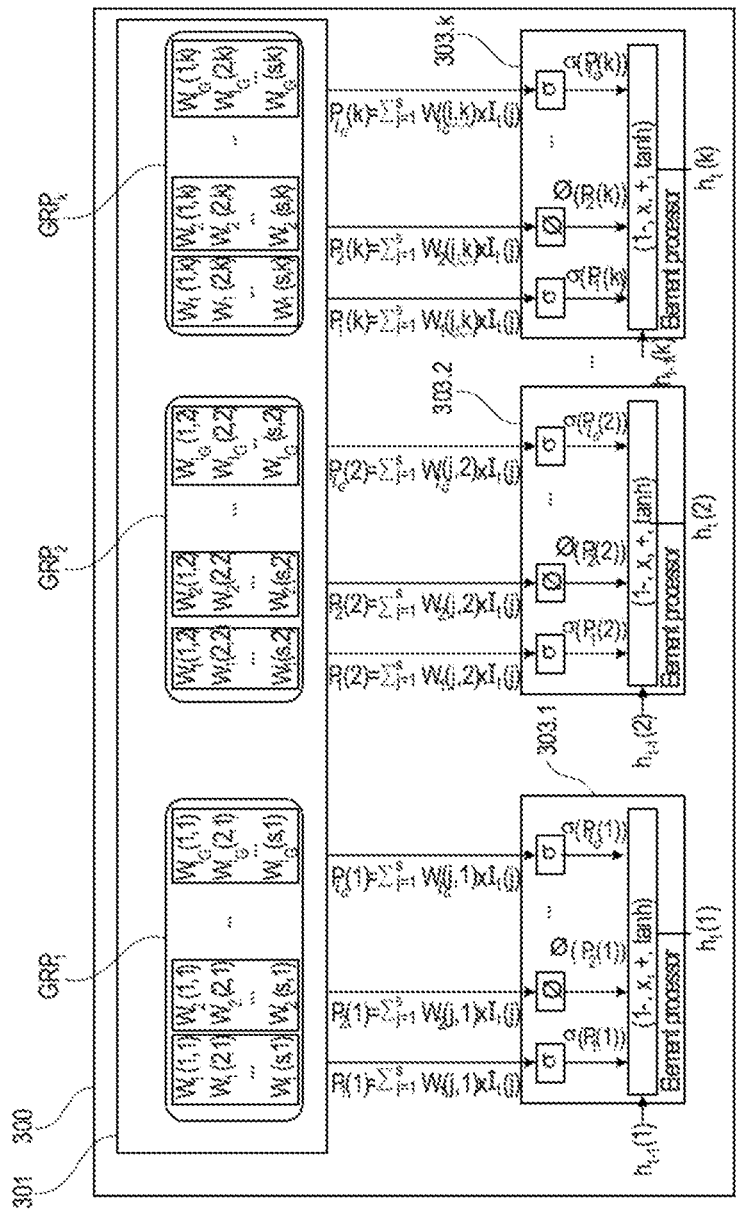
FIG. 3 depicts a diagram of an electronic system, in accordance with the exemplary embodiments.

FIG. 3 depicts a diagram of an electronic system 300 in accordance with an example of the present subject matter. The electronic system 300 may be configured to compute all elements of the current hidden state $h_t$ one by one. The electronic system 300 may be configured to perform a non-linear transformation that maps an input signal $x_t$ at time t and a hidden state $h_{t-1}$ of the previous time step t−1 to the current hidden state $h_t$. For that, the electronic system 300 may comprise a number of element processors 303.1 through 303.k that is equal to the number k of elements of the hidden state vector $h_t$, so that each of the element processors may provide a respective element of the hidden state vector $h_t$. The electronic system 300 further comprises a memory array 301 where k groups of columns $GRP_1$, $GRP_2 \ldots GRP_k$ are stored. The areas where the groups of columns $GRP_1, GRP_2 \ldots GRP_k$ are stored may be referred to as distinct memory areas (or distinct memory subareas). Each group of columns of the k groups of columns is stored consecutively. Each group of columns of the k groups of columns are columns that enable to compute a respective element of the hidden state vector $h_t$. For example, the group of columns $GRP_1$ comprises columns that enable to compute element $h_t(1)$ of the hidden state vector $h_t$. Each of the element processors 303.1 through 303.k may be configured to compute its respective element of the hidden state vector $h_t$ as described with reference to element processor 103 of FIG. 1.

Figure 4:
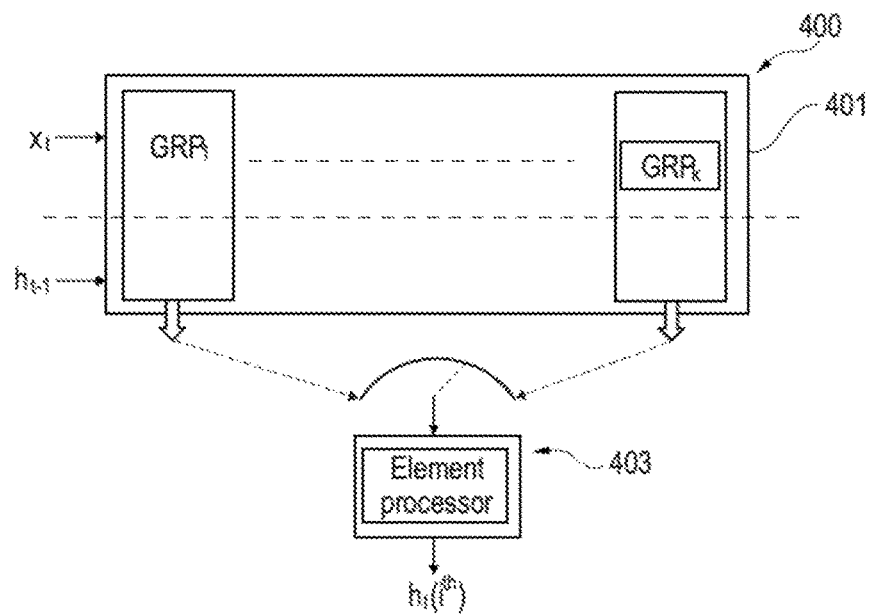
FIG. 4 depicts a diagram of an electronic system, in accordance with the exemplary embodiments.

FIG. 4 depicts a diagram of an electronic system 400 in accordance with an example of the present subject matter. The electronic system 400 may be configured to compute all elements of the current hidden state $h_t$ one by one. The electronic system 400 may be configured to perform a non-linear transformation that maps an input signal $x_t$ at time t and a hidden state $h_{t-1}$ of the previous time step t−1 to the current hidden state $h_t$. For that, the electronic system 400 may comprise a single element processor 403. The memory array 401 of the electronic system 400 is similar to the memory array 303 of FIG. 3, where k groups of columns $GRP_1, GRP_2 \ldots GRP_k$ are stored e.g. k-1.28. The electronic system 400 may be configured so that outputs of different groups may be multiplexed by using the single element processor 403. For example, as shown in FIG. 4, the single element processor 403 is multiplexed across all the groups to compute one hidden state vector element at a time. This implementation may be beneficial in case of resource constrained application.

Figure 5:
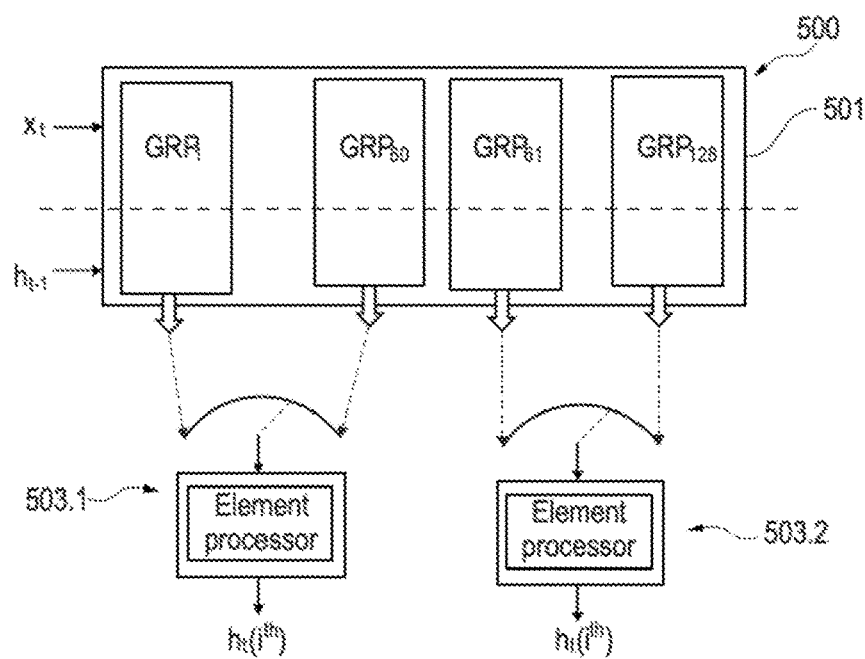
FIG. 5 depicts a diagram of an electronic system, in accordance with the exemplary embodiments.

One extension of the implementation of FIG. 4 may be to use more than one element processors that can be multiplexed across desired set of groups. This is shown, for example, in FIG. 5 where two element processors 503.1 and 503.2 are used. The electronic system 500 may be configured so that outputs of a set of groups may be multiplexed by using the element processor 503.1 and another set of groups may be multiplexed by using the element processor 503.2. For example, as shown in FIG. 5, the element processor 503.1 is multiplexed across all the groups $GRP_1$ to $GRP_{60}$ to compute one hidden state vector element at a time for the first sixty elements of the hidden state vector $h_t$. The element processor 503.3 is multiplexed across all the groups $GRP_{G1}$ to $GRP_{128}$ to compute one hidden state vector element at a time for the last sixty-eight elements of the hidden state vector $h_t$.

Figure 6A:
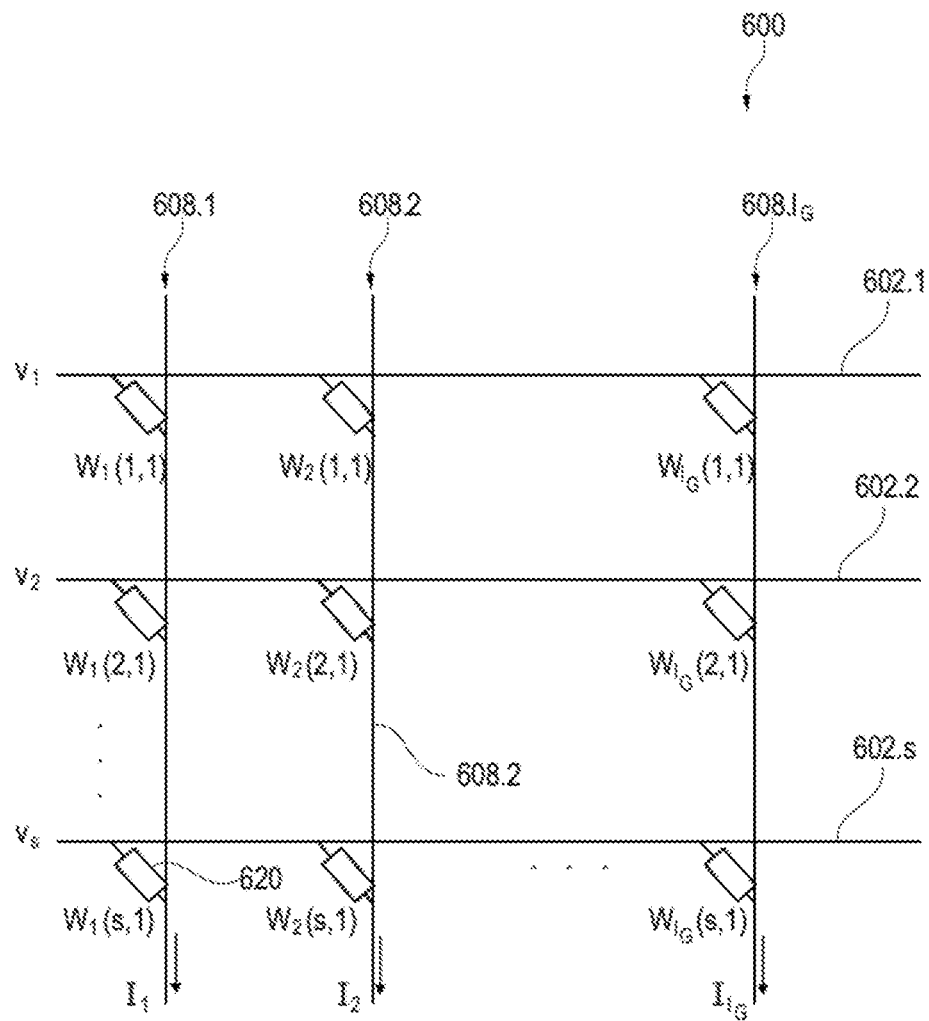
FIG. 6A depicts a diagram of a memory array, in accordance with the exemplary embodiments.

FIG. 6A depicts a diagram of a memory array 600 in accordance with an example of the present subject matter. The memory array 600 may for example be described with reference to FIG. 1.

The memory array 600 may be a crossbar array of computational memories that provide local data storage along with voltage sequences illustrating the operation of the memories. FIG. 6A is a diagram of a two-dimensional (2D) crossbar array 600 that may, for example, perform a matrix-vector multiplication. Crossbar array 600 is formed from a set of conductive row wires $602.1 \ldots 602.s$ and a set of conductive column wires $608.1 \ldots 608.1_G$ that intersect the set of conductive row wires $602.1$-$602.s$.

The conductive column wires may be referred to as column lines and conductive row wires may be referred to as row lines. The number of lines and columns may be defined based on the number of elements of the hidden state vector to be computed. In this case, the first element of the hidden state vector may be computed. For that, the first element of each of the $1_G$ activation vectors may need to be computed, thus the memory array may comprise at least $1_G$ columns. The number of the lines is defined by the number of rows of each of the weight matrices, namely s.

The intersections between the set of row wires and the set of column wires are separated by computational memories each having its own value, depicted as W(i,j), respectively where i=1 . . . s, and j=1 . . . $1_G$. For ease of illustration, only one computational memory 620 is labeled with a reference number in FIG. 6A. For example, the column 608.1 of the memory array stores the elements of the column at position 1 of the weight matrix $W_1$. The column 608.2 of the memory array stores the elements of the column at position 1 of the weight matrix $W_2$ and so on.

Input voltages $v_1 \ldots v_s$ are applied to row wires 602.1-602.s respectively. Each column wire 608.1-608.k sums the currents $I_1, I_2 \ldots I_{l_G}$ generated by each computational memory along the particular column wire. For example, as shown in FIG. 6A, the current generated by column wire 608.2 is according to the equation $I_2 = v_1 \cdot W_2(1,1) + v_2 \cdot W_2(2,2) + v_3 \cdot W_2(3,1) + \ldots + v_s \cdot W_2(s,1)$. Thus, array 600 computes the matrix-vector multiplication by multiplying the values stored in the computation memories 620 by the row wire inputs, which are defined by voltages $v_1, v_s$. Accordingly, the multiplication may be performed locally at each computational memory 620 of the array 600 using the memory array itself plus the relevant row or column wire of array 600.

Figure 6B:
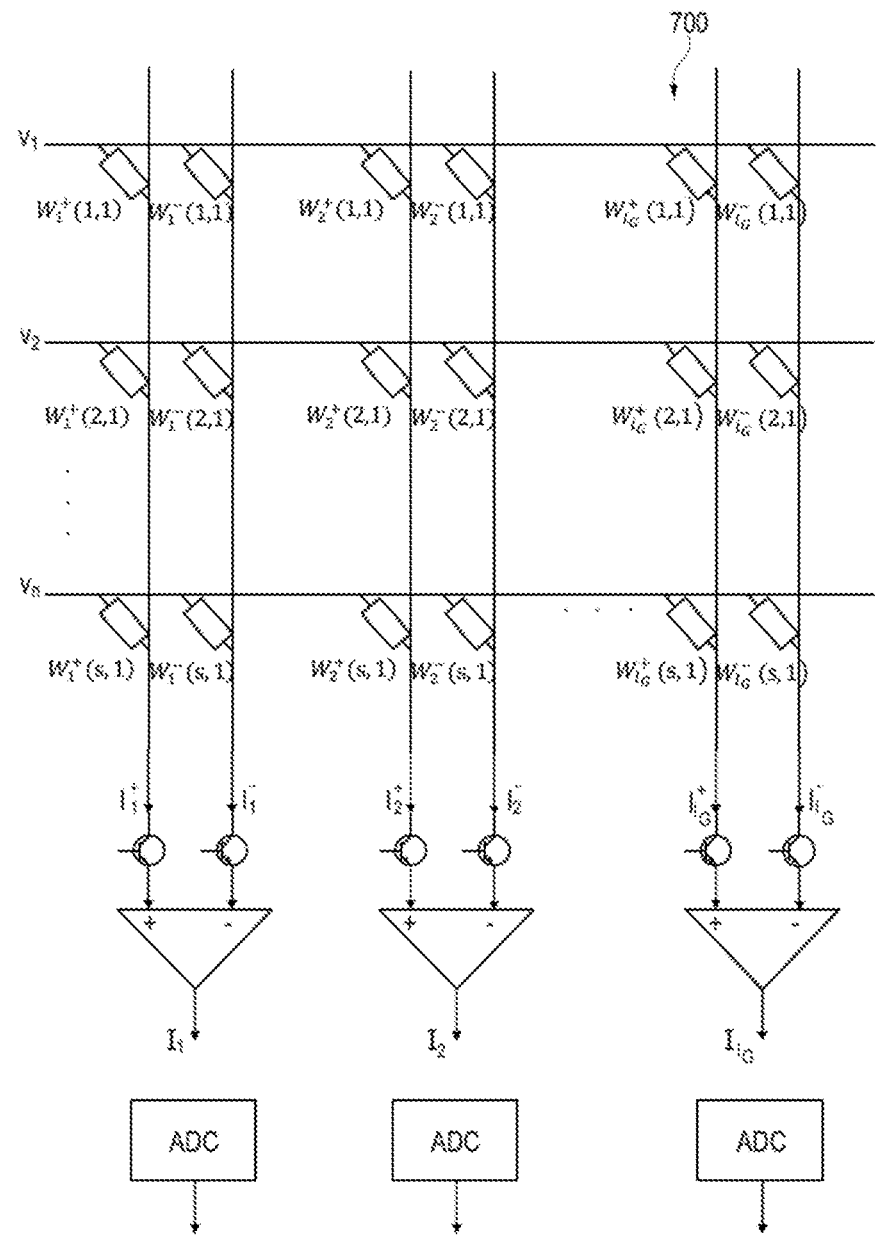
FIG. 6B depicts a diagram of a memory array, in accordance with the exemplary embodiments.

FIG. 6B depicts a diagram of a memory array 700 in accordance with an example of the present subject matter. The memory array 700 may, for example, be described with reference to FIG. 1. The memory array 700 may be a crossbar array of memristor devices. For a set of s distinct parallel lines arranged horizontally (s rows) and another set of $2l_G$ distinct parallel lines arranged perpendicular ($l_G$ columns) to s lines such that a memristor device is present at all $s \times 2l_G$ intersections of these lines, the memory array 700 forms a crossbar of PCM devices. Current through a single memristor device is a product of the voltage applied across it and its conductance value. Since conductance is always positive, a single column consists of two vertical lines together representing signed values in the array and their currents are subtracted to get the net current of that column as given by the following equation $$I_j = I_j^+ - I_j^-, \text{ where } I_j^+ = \Sigma_{i=1:s} W^+(i,j) \times v_i \text{ and}$$

$$I_j^- = \Sigma_{i=1:s} W^-(i,j) \times v_i.$$

$W^+$ may encode a positive part of a weight, and $W^-$ may encode a negative part of a weight. For example, $W^+ = W$ and $W^- = 0$ if the weight matrix W is positive, and $W^1 = 0$ and $W = |W|$ if W is negative.

Matrix-vector multiplication may be computed by applying voltages along the rows of the crossbar and summing up currents (using Kirchhoff's current law) along the columns in the crossbar. Net output current is usually measured using analog to digital converter (ADC) for further computations. An ADC can convert an analog value to its digital representation provided input analog value is always bounded, otherwise ADC output saturates. In another example, a single or fewer ADCs may be used per crossbar array to sample column currents. The output of any group may be bounded to an interval [−4,4]. This may facilitate use of a single or fewer ADCs that can be multiplexed across all columns.

Another example of the memory array may be a digital systolic array of computational memories. The systolic array may be a homogenous array of tightly coupled computational memories. Each computational memory has a memory to store a parameter value and usually multiply and add logic operation. In the systolic array, input data may be read only once, and it is reused multiple times without storing it back into any intermediate register. Only adjacent data processing units of the systolic array may be coupled using wires which makes wiring short and energy efficient. Such an implementation can accelerate matrix multiplication compared to a GPU/CPU. In particular, the systolic arrays may be used to implement gated RNNs. In such implementation, the present mapping technique may be used so that it makes the design of gating operation computation units scalable and multiplexable.

Figure 6C:
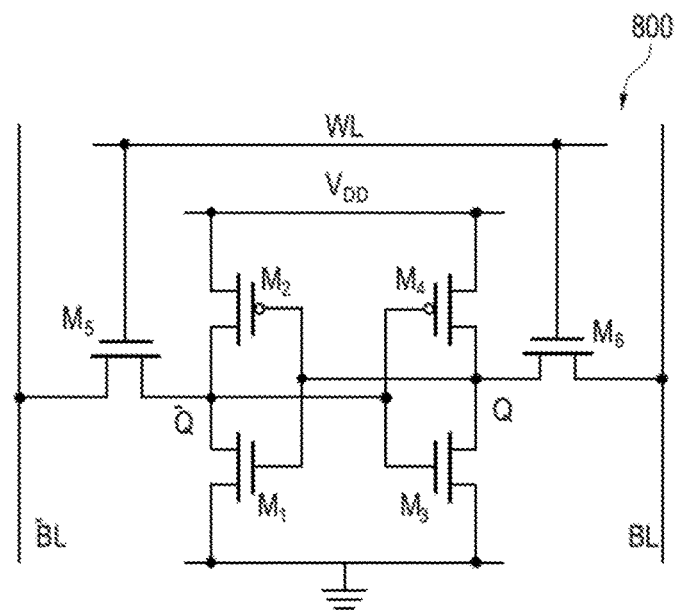
FIG. 6C depicts a diagram of a computational memory, in accordance with the exemplary embodiments.

FIG. 6C depicts an example a computation memory 800 in accordance with the present subject matter. The computation memory 800 may be a SRAM cell. The SRAM cell is an electronic circuit that can store 1-bit of memory. An ability to change the memory state of an SRAM cell makes it a suitable candidate for a computational memory. FIG. 6C shows a 6-transistor SRAM cell.

Figure 6D:
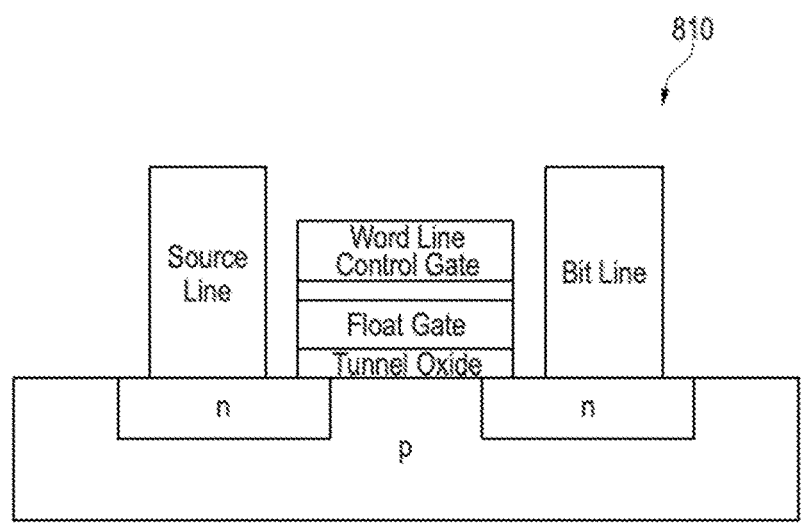
FIG. 6D depicts a diagram of a computational memory, in accordance with the exemplary embodiments.

FIG. 6D depicts an example computation memory 810 in accordance with the present subject matter. The computation memory 810 may be a Flash memory. The Flash memory device is an electronic device that can store 1-bit of memory. An ability to change the memory state of a Flash device makes it a suitable candidate for a computational memory.

Figure 7:
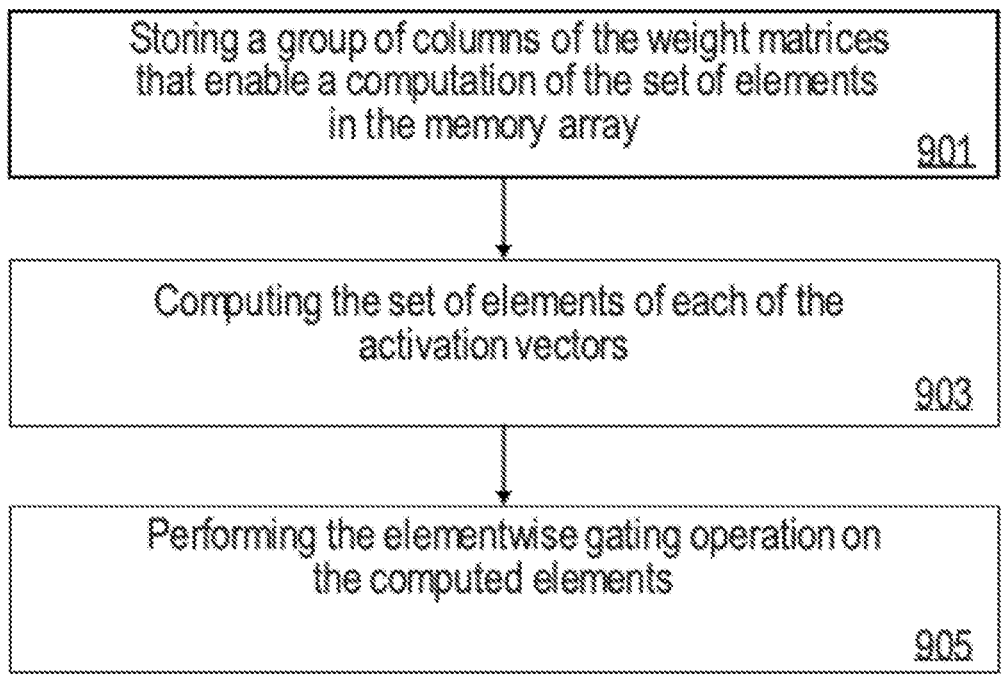
FIG. 7 depicts a flowchart of a method for computing elements of a hidden state vector, in accordance with the exemplary embodiments.

FIG. 7 is a flowchart of a method for computing a set of one or more elements of a hidden state vector of a gated recurrent neural network. The gated RNN comprises at least one gated unit as described with reference to FIGS. 1-6.

The term "set of elements" refer to a certain number of elements of a vector having respective positions in the vector. Assuming for simplification of the description that the set of elements comprises three elements e.g. elements having positions 1, 2 and 3 respectively. In this case, the set of elements refers to three elements having positions 1, 2 and 3 e.g. the expression "the set of elements of vector X" refers to three elements having positions 1, 2 and 3 in the vector X. That is, the method may enable to compute the elements $h_t(1)$, $h_t(2)$ and $h_t(3)$ (noted $h_t(1:2:3)$) of the hidden state vector $h_t$. Further assuming for simplification of the description that the gated unit is a LSTM unit. That is, the hidden state vector $h_t$ may be defined as follows.

$$f_t = \sigma_g(w_f x_t + u_f h_{t-1} + b_f) = \sigma_g(W_f I_t + b_f) \quad \text{(Eq 1)}$$

$$i_t = \sigma_g(w_i x_t + u_i h_{t-1} + b_i) = \sigma_g(W_i I_t + b_i) \quad \text{(Eq 2)}$$

$$o_t = \sigma_g(w_o x_t + u_o h_{t-1} + b_o) = \sigma_g(W_o I_t + b_o) \quad \text{(Eq 3)}$$

$$\tilde{c}_t = \varnothing_h(w_c x_t + u_c h_{t-1} + b_c) = \varnothing_h(W_c I_t + b_c) \quad \text{(Eq 4)}$$

$$c_t = f_t \odot c_{t-1} + i_t \tilde{c}_t \quad \text{(Eq 5)}$$

$$h_t + o_t \odot \varnothing_h(c_t) \quad \text{(Eq 6)}$$

In step 901, a group of columns of the weight matrices that enable a computation of the set of elements $h_t(1:2:3)$ may be stored in the memory array. In order to compute the set of elements, the corresponding elements of the activation vectors defined by equations Eq 1 to Eq 4 may be needed. Namely the activation vector elements or $o_t(1:2:3)$, $f_t(1:2:3)$, $i_t(1:2:3)$ and $\tilde{c}_t(1:2:3)$ may be computed in order to compute the element $h_t(1:2:3)$. For example, in order to compute the elements $f_t(1:2:3)$, a subgroup sb1 of columns at position 1, 2 and 3 of the weight matrix $W_f$ may be used. In order to compute the elements $i_t(1:2:3)$, a subgroup sb2 of columns at position 1, 2 and 3 of the weight matrix $W_t$ may be used. In order to compute the elements $o_t(1:2:3)$, a subgroup sb3 of columns at position 1, 2 and 3 of the weight matrix $W_o$ may be used. In order to compute the elements $\tilde{c}_t(1:2:3)$, a subgroup sb4 of columns at position 1, 2 and 3 of the weight matrix $W_t$ may be used. Thus, the group of columns may be formed by the subgroups sb1, sb2, ab3 and sb4. The group of columns may comprise the three columns of the weight matrix $W_f$, the three columns of the weight matrix $W_t$, the three columns of the weight matrix $W_o$ and the three columns of the weight matrix $W_o$. Each column of the group may be stored in a respective column of the memory array. The columns of each subgroup of the subgroups sb1, sb2, ab3 and sb4 may be stored consecutively. Using the crossbar array of FIG. 6A, the subgroup of columns sb1 may be stored in the consecutive columns 608.1, 608.2 and 608.3 respectively. The subgroup of columns sb2 may be stored in the consecutive columns 608.4, 608.5 and 608.6 respectively. The subgroup of columns sb3 may be stored in the consecutive columns 608.7, 608.8 and 608.9 respectively. The subgroup of columns sb4 may be stored in the consecutive columns 608.10, 608.11 and 608.12 respectively.

The set of elements of each activation vector of the activation vectors may be computed in step 903 using a respective subgroup of columns the subgroups of columns sb1, sb2, ab3 and sb4. For example, the elements $f_t(1:2:3)$ may be computed using the subgroup sb1 in accordance with the equation Eq 1. The elements $i_t(1:2:3)$ may be computed using the subgroup sb2 in accordance with the equation Eq 2. The elements $o_t(1:2:3)$ may be computed using the subgroup sb3 in accordance with the equation Eq 3. The elements $\tilde{c}_t(1:2:3)$ may be computed using the subgroup sb4 in accordance with the equation Eq 4.

The element processor may perform in step 905 the elementwise gating operation according to the equations Eq 5 and Eq 6 on the computed elements $f_t(1:2:3)$, $i_t(1:2:3)$, $o_t(1:2:3)$ and $\tilde{c}_t(1:2:3)$. This may result in the set of elements $h_t(1:2:3)$. In this example, the elementwise gating operation includes element wise multiplications and an application of an activation function.

Figure 8:
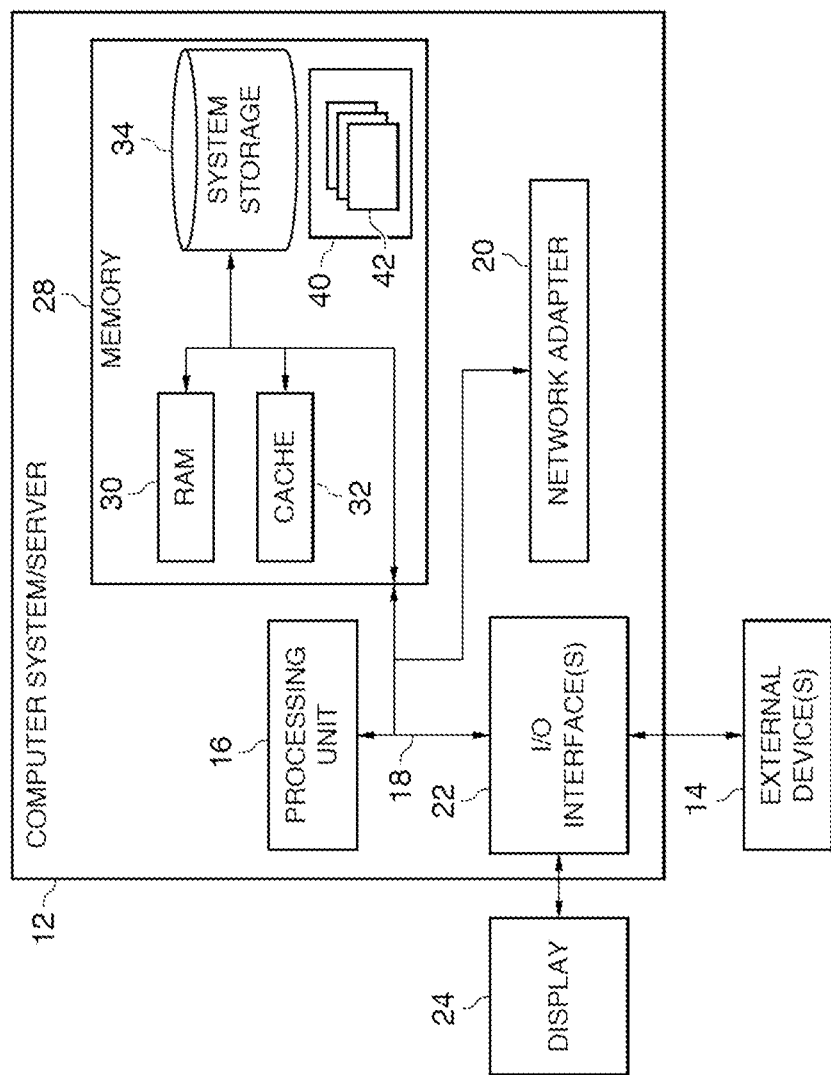
FIG. 8 depicts an exemplary block diagram depicting hardware components, in accordance with the exemplary embodiments.

FIG. 8 depicts a block diagram of hardware devices, in accordance with the exemplary embodiments. It should be appreciated that FIG. 8 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
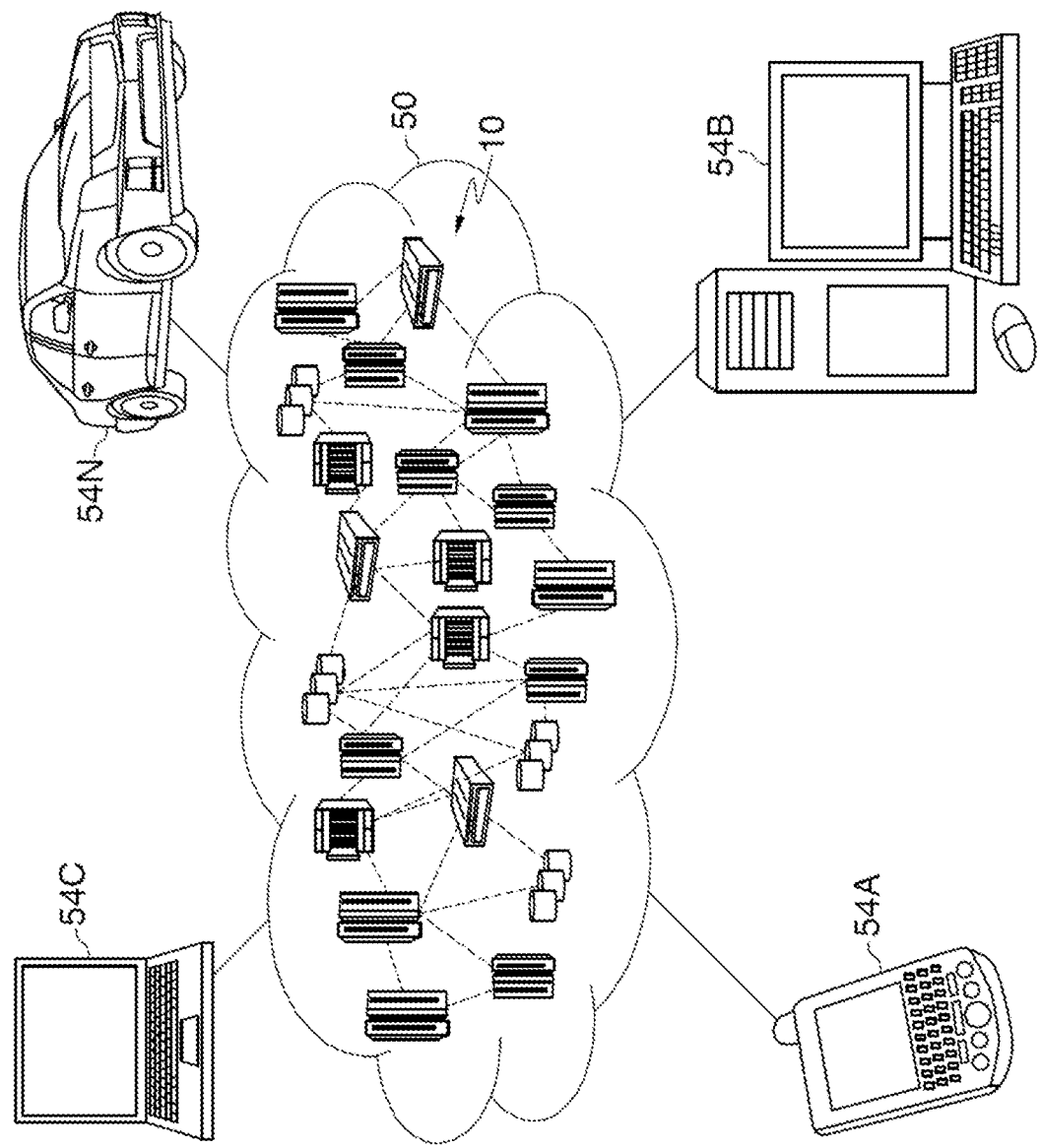
FIG. 9 depicts a cloud computing environment, in accordance with the exemplary embodiments.

Referring now to FIG. 9, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 40 and cloud computing environment 50 can communicate with any type of computerized device over any type of network and/or network addressable connection (e.g., using a web browser).

Figure 10:
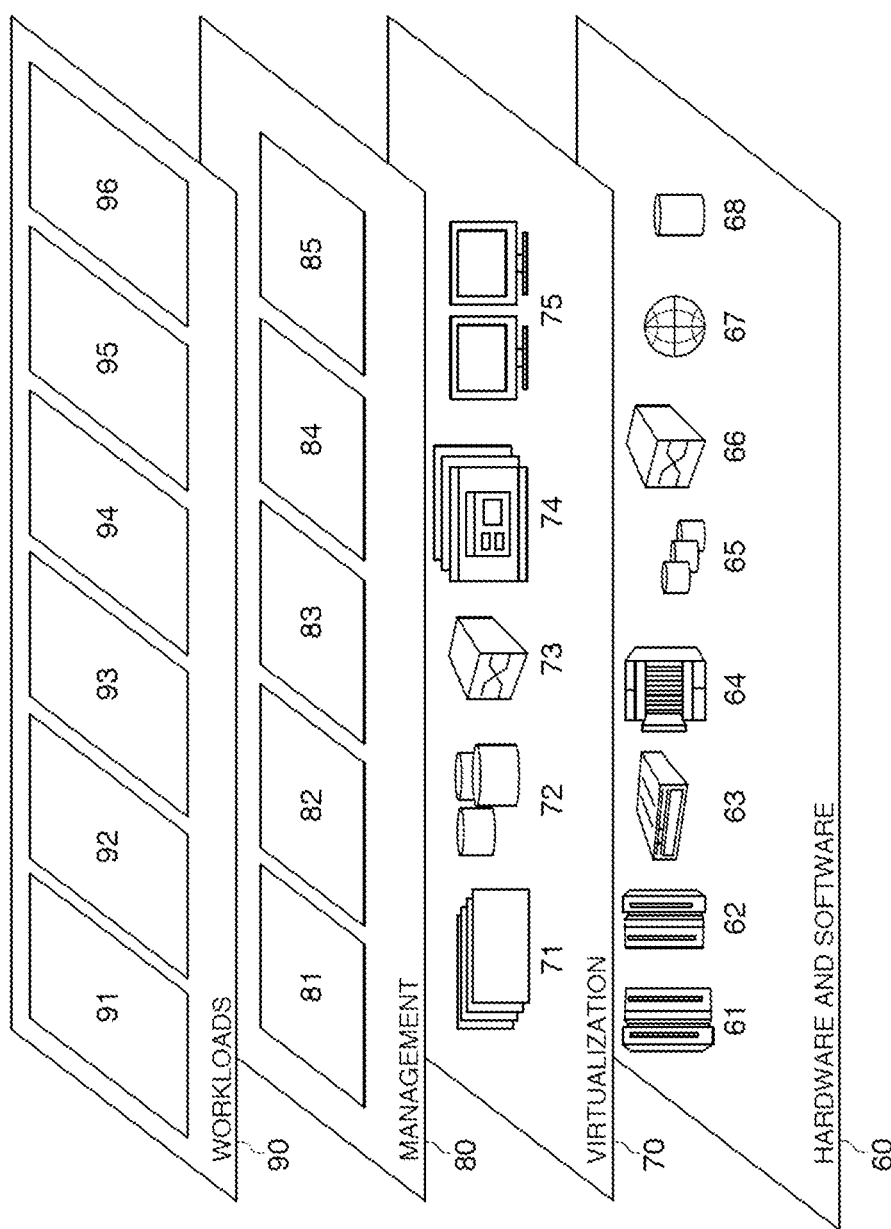
FIG. 10 depicts abstraction model layers, in accordance with the exemplary embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and neural network computations 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a gated recurrent neural network (RNN) having a hidden state vector, wherein the hidden state vector is defined by an elementwise gating operation of multiple activation vectors, wherein each activation vector of the multiple activation vectors is a function of a weighted vector, and wherein the weighted vector results from a multiplication of an input vector by a distinct weight matrix associated with the activation vector, the method comprising:
providing an element processor;
providing a memory array for a respective set of one or more elements from different sets of one or more elements of the hidden state vector;
selectively storing in the memory array a group of columns of weight matrices that enable a computation of the respective set of one or more elements, wherein the selectively storing further comprises storing a set of one or more columns from the group of columns of the weight matrices consecutively in the memory array to form one or more groups of consecutive columns for the respective set of one or more elements, and wherein output from each group is provided to the element processor;
computing one or more elements of each of the multiple activation vectors using the set of one or more columns of the group of columns associated with each of the multiple activation vectors; and
performing by the element processor the elementwise gating operation on the computed one or more elements, resulting in the set of one or more elements.

2. The method of claim 1, further comprising:
providing an other distinct memory array for a respective other set of one or more elements of the hidden state vector;
storing in the other memory array an other group of columns of weight matrices that enable a computation of the other set of one or more elements;
computing one or more elements of each of the multiple activation vectors using an other set of one or more columns of the other group of columns associated with each of the multiple activation vectors; and
performing by the element processor the elementwise gating operation on the computed elements, resulting in the other set of one or more elements.

3. The method of claim 2, wherein:
storing the other group of columns, computing the one or more elements of each of the multiple activation vectors, and performing by the element processor the elementwise gating operation on the computed elements is performed concurrently.

4. The method of claim 2, wherein:
providing the other distinct memory array, storing the other group of columns, computing the one or more elements of each of the multiple activation vectors, and performing by the element processor the elementwise gating operation on the computed elements is repeated until all elements of the hidden state vector are computed; and
the element processor is provided with a multiplexing feature such that it computes one set of elements at a time.

5. The method of claim 1, wherein:
each element of the set of one or more elements has a respective element position in the hidden state vector;
the computed one or more elements comprise multiple sets of one or more computed elements of the multiple activation vectors respectively;
each set of the one or more computed elements comprises a set of one or more element positions in the respective activation vector; and
computing one or more elements for each of the activation vectors comprises:
receiving at the memory array values of the input vector and outputting from the associated set of one or more columns a set of result elements of the weighted vector respectively, wherein the set of result elements comprises the set of one or more element positions in the weighted vector;
feeding the set of result elements to the element processor; and
performing the computation of the set of one or more computed elements of the activation vector using the set of result elements.

6. The method of claim 1, wherein:
the memory array comprises row lines, column lines that intersect the row lines, and computational memories coupled between the row lines and the column lines at the junctions formed by the row lines and column lines;
a computational memory of the computational memories represents a value of an element of one or more columns of the group of columns; and
storing the group of columns comprises storing all elements of each column of the group of columns in computational memories of a respective single column line of the memory array.

7. The method of claim 6, wherein the computational memory is any one of a resistive memory element, static random-access memory (SRAM) element, or flash memory element.

8. A computer program product for a gated recurrent neural network (RNN) having a hidden state vector, wherein the hidden state vector is defined by an elementwise gating operation of multiple activation vectors, wherein each activation vector of the multiple activation vectors is a function of a weighted vector, and wherein the weighted vector results from a multiplication of an input vector by a distinct weight matrix associated with the activation vector, the computer program product comprising:
one or more non-transitory computer-readable storage media and program instructions stored on the one or more non-transitory computer-readable storage media capable of performing a method, the method comprising:
providing an element processor;
providing a memory array for a respective set of one or more elements from different sets of one or more elements of the hidden state vector;

selectively storing in the memory array a group of columns of weight matrices that enable a computation of the respective set of one or more elements, wherein the selectively storing further comprises storing a set of one or more columns from the group of columns of the weight matrices consecutively in the memory array to form one or more groups of consecutive columns for the respective set of one or more elements, and wherein output from each group is provided to the element processor;

computing one or more elements of each of the multiple activation vectors using the set of one or more columns of the group of columns associated with each of the multiple activation vectors; and performing by the element processor the elementwise gating operation on the computed one or more elements, resulting in the set of one or more elements.

9. The computer program product of claim 8, further comprising:

providing an other distinct memory array for a respective other set of one or more elements of the hidden state vector;

storing in the other memory array an other group of columns of weight matrices that enable a computation of the other set of one or more elements;

computing one or more elements of each of the multiple activation vectors using an other set of one or more columns of the other group of columns associated with each of the multiple activation vectors; and performing by the element processor the elementwise gating operation on the computed elements, resulting in the other set of one or more elements.

10. The computer program product of claim 9, wherein:

storing the other group of columns, computing the one or more elements of each of the multiple activation vectors, and performing by the element processor the elementwise gating operation on the computed elements is performed concurrently.

11. The computer program product of claim 9, wherein:

providing the other distinct memory array, storing the other group of columns, computing the one or more elements of each of the multiple activation vectors, and performing by the element processor the elementwise gating operation on the computed elements is repeated until all elements of the hidden state vector are computed; and the element processor is provided with a multiplexing feature such that it computes one set of elements at a time.

12. The computer program product of claim 8, wherein:

each element of the set of one or more elements has a respective element position in the hidden state vector;

the computed one or more elements comprise multiple sets of one or more computed elements of the multiple activation vectors respectively;

each set of the one or more computed elements comprises a set of one or more element positions in the respective activation vector; and computing one or more elements for each of the activation vectors comprises:

receiving at the memory array values of the input vector and outputting from the associated set of one or more columns a set of result elements of the weighted vector respectively, wherein the set of result elements comprises the set of one or more element positions in the weighted vector;

feeding the set of result elements to the element processor; and performing the computation of the set of one or more computed elements of the activation vector using the set of result elements.

13. The computer program product of claim 8, wherein:

the memory array comprises row lines, column lines that intersect the row lines, and computational memories coupled between the row lines and the column lines at the junctions formed by the row lines and column lines;

a computational memory of the computational memories represents a value of an element of one or more columns of the group of columns; and storing the group of columns comprises storing all elements of each column of the group of columns in computational memories of a respective single column line of the memory array.

14. The computer program product of claim 13, wherein the computational memory is any one of a resistive memory element, static random-access memory (SRAM) element, or flash memory element.

15. A computer system for a gated recurrent neural network (RNN) having a hidden state vector, wherein the hidden state vector is defined by an elementwise gating operation of multiple activation vectors, wherein each activation vector of the multiple activation vectors is a function of a weighted vector, and wherein the weighted vector results from a multiplication of an input vector by a distinct weight matrix associated with the activation vector, the computer system comprising:

one or more computer processors, one or more computer-readable storage media, and program instructions stored on the one or more of the computer-readable storage media for execution by at least one of the one or more processors capable of performing a method, the method comprising:

providing an element processor;

providing a memory array for a respective set of one or more elements from different sets of one or more elements of the hidden state vector;

selectively storing in the memory array a group of columns of weight matrices that enable a computation of the respective set of one or more elements, wherein the selectively storing further comprises storing a set of one or more columns from the group of columns of the weight matrices consecutively in the memory array to form one or more groups of consecutive columns for the respective set of one or more elements, and wherein output from each group is provided to the element processor;

computing one or more elements of each of the multiple activation vectors using the set of one or more columns of the group of columns associated with each of the multiple activation vectors; and performing by the element processor the elementwise gating operation on the computed one or more elements, resulting in the set of one or more elements.

16. The computer system of claim 15, further comprising:

providing an other distinct memory array for a respective other set of one or more elements of the hidden state vector;

storing in the other memory array an other group of columns of weight matrices that enable a computation of the other set of one or more elements;

computing one or more elements of each of the multiple activation vectors using an other set of one or more columns of the other group of columns associated with each of the multiple activation vectors; and performing by the element processor the elementwise gating operation on the computed elements, resulting in the other set of one or more elements.

17. The computer system of claim 16, wherein:

storing the other group of columns, computing the one or more elements of each of the multiple activation vectors, and performing by the element processor the elementwise gating operation on the computed elements is performed concurrently.

18. The computer system of claim 16, wherein:

providing the other distinct memory array, storing the other group of columns, computing the one or more elements of each of the multiple activation vectors, and performing by the element processor the elementwise gating operation on the computed elements is repeated until all elements of the hidden state vector are computed; and the element processor is provided with a multiplexing feature such that it computes one set of elements at a time.

19. The computer system of claim 15, wherein:

each element of the set of one or more elements has a respective element position in the hidden state vector;

the computed one or more elements comprise multiple sets of one or more computed elements of the multiple activation vectors respectively;

each set of the one or more computed elements comprises a set of one or more element positions in the respective activation vector; and computing one or more elements for each of the activation vectors comprises:

receiving at the memory array values of the input vector and outputting from the associated set of one or more columns a set of result elements of the weighted vector respectively, wherein the set of result elements comprises the set of one or more element positions in the weighted vector;

feeding the set of result elements to the element processor; and performing the computation of the set of one or more computed elements of the activation vector using the set of result elements.

20. The computer system of claim 15, wherein:

the memory array comprises row lines, column lines that intersect the row lines, and computational memories coupled between the row lines and the column lines at the junctions formed by the row lines and column lines;

a computational memory of the computational memories represents a value of an element of one or more columns of the group of columns; and storing the group of columns comprises storing all elements of each column of the group of columns in computational memories of a respective single column line of the memory array.

* * * * *